United States Patent [19]
Hulse et al.

[11] Patent Number: 5,490,472
[45] Date of Patent: Feb. 13, 1996

[54] CARBON FIBER SPAR AND METHOD OF MAKING

[75] Inventors: David J. Hulse, Mooresville; John G. Heinemann, Charlotte, both of N.C.

[73] Assignee: Isomat, Inc., Charlotte, N.C.

[21] Appl. No.: 342,142

[22] Filed: Nov. 18, 1994

Related U.S. Application Data

[63] Continuation of Ser. No. 137,286, Oct. 14, 1993, abandoned.

[51] Int. Cl.$^6$ .................................................... B63H 15/00
[52] U.S. Cl. ................................ 114/90; 114/357
[58] Field of Search ................................ 156/148, 149, 156/173, 175, 189, 192, 194, 257, 268, 285, 286; 52/727; 114/89–91, 357, 97, 112; 428/36.1–36.3

[56] References Cited

U.S. PATENT DOCUMENTS

| | | | |
|---|---|---|---|
| 3,300,355 | 1/1967 | Adams | 156/189 |
| 4,657,615 | 4/1987 | Braun et al. | 156/189 |
| 4,700,647 | 10/1987 | Pabsch | 114/89 |
| 4,964,825 | 10/1990 | Paccoret et al. | 441/79 |

*Primary Examiner*—Edwin L. Swinehart
*Attorney, Agent, or Firm*—St. Onge Steward Johnston & Reens

[57] ABSTRACT

A spar is provided comprising an inner layer of fiber, an outer layer of fiber, a hollow between the inner and outer layers of fiber with the inner fiber layer forming a surface of the hollow such that it is integral in one piece with the spar. The spar preferably includes a cut through the outer fiber layer into the hollow to form a groove for attaching a sail. The invention also provides a method of making spars including the steps of forming a first layer, pressing the layer inwardly along a line to form a groove, applying a second layer over the first, and combining the layers together except along the line. The method preferably also includes the step of cutting through the second layer along the line into the groove.

27 Claims, 6 Drawing Sheets

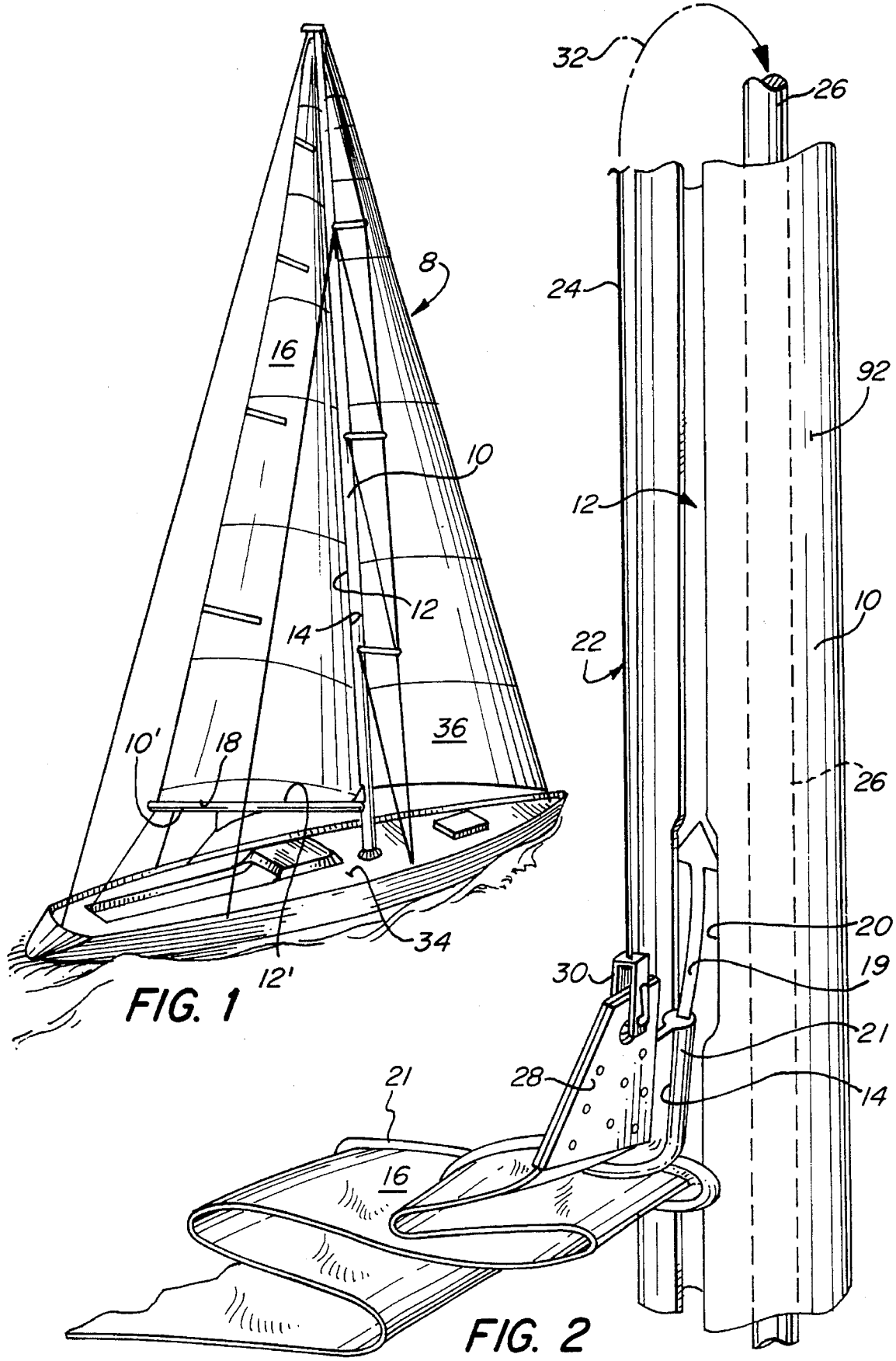

CARBON FIBER SPAR AND METHOD OF MAKING

This is a continuation application of application Ser. No. 08/137,286 filed on Oct. 14, 1993, now abandoned.

FIELD OF THE INVENTION

The invention relates to carbon fiber spars for sailboats and, more particularly, to carbon fiber spars having an integral sail-attaching groove. The invention also relates to methods of making carbon fiber spars.

BACKGROUND OF THE INVENTION

Carbon fiber spars including spinnaker poles and masts are known in the art. Carbon fiber spinnaker poles have been used for a number of years and are generally made in two pieces on tapered male mandrels, or in some instances on male mandrels which are then placed in female molds. The pole pieces are generally formed from resin pre-impregnated sheets which may include either woven carbon fiber or unidirectional carbon fibers on a paper backing. The wider ends are connected together, usually with glue or resin pre-impregnated carbon fiber tape to form a pole tapered toward each end. These spinnaker poles do not include sail attaching grooves but are designed to hold a sail or sail leads outboard of the boat. Fixtures mounted at ends of the pole connect the pole to the sail or sail lead.

Carbon fiber masts are also known. One such design is illustrated in prior art FIGS. 5 and 6. As illustrated in FIG. 5, these masts are made with two longitudinally extending pieces or halves which are glued together, after curing, to form the mast circumference. Each of the pieces is laid up by hand from resin pre-impregnated carbon fiber sheets in a female tool. It is necessary to make the prior art mast in two pieces because this permits access to the inside surface of one of the mast pieces for gluing the groove mold and laying-up the sail-attaching groove. The mast piece is cured prior to gluing and lay up.

In other prior art carbon fiber mast designs, the mast is a tapered tube which does not include a sail-attaching groove. Instead, the sail is provided with a sleeve which fits over the tube, or a track is attached to the finished mast for slidingly receiving cars attached along an edge of the sail. These designs are generally overly built and thus disadvantageously excessively heavy. Sleeve type sail attachment prevents the use of rigging to support the mast requiring over building for large masts to be supported. Addition of tracks and cars means excess weight on the mast.

Carbon fiber spars, and especially masts, provide improved performance on sailboats as compared with more typical aluminum masts due to the well known high strength and low weight properties of carbon fiber. Reducing weight in a sailboat mast is important because it reduces the pitching moment by a factor of the square of the distance to the center of mass of the boat. Boats with high pitching moments perform poorly in a seaway. A prior art carbon fiber mast of given size and strength will weigh about one-half as much as an aluminum mast of similar size and strength, providing a sizable reduction in pitching moment and consequent improvement in performance.

Notwithstanding these advantages, most sailboat design classes, measurement rules, and performance or other handicapping systems have banned prior art carbon fiber masts as too expensive due to the time and labor required to lay up the mast by hand, to lay up the mast in pieces, to pre-core a piece of the mast, to glue in a groove mold, to lay up the groove mold or spacer by hand, and/or to glue the pieces together.

Another disadvantage of prior art carbon fiber masts is that the inside surface of the mast may be rough and irregular due to the hand lay-up process. This rough surface may snag or abrade the halyards and other sail control lines which pass within the mast, accelerating wear, and necessitating more frequent replacement.

The manual construction of prior art masts may provide a varying thickness around the circumference and along the length of the mast which may cause irregular flex characteristics. Similarly, manual construction may lead to nonreproduceable flex characteristics among a series of masts intended to be identical. Manual manufacturing may also introduce defects into the mast such as air pockets which may lead to premature breakage. The glue used to combine mast pieces or components may fail in the harsh sailing environment of temperature extremes and salt water, causing spar failure and possibly injuring sailors. Further, manual manufacture may increase material costs in requiring glue, excess carbon fiber, excess resin, and may also increase material costs due to wastage and spoilage of resin pre-impregnated carbon fiber sheets which may have a limited shelf life.

What is desired, therefore, is a carbon fiber spar having an integral sail-attaching groove which may be economically formed in order to attain the performance advantages of carbon fiber at little or no additional cost as compared with aluminum. Such a spar would likely be approved for use in virtually all design classes, measurement rules and handicapping systems. Providing the spar with a smooth inner surface and forming the spar without a gluing step, multiple coring steps, and manual carbon fiber lay up are also desirable.

SUMMARY OF THE INVENTION

Accordingly, it is an object of the invention to provide a carbon fiber spar to attain the performance advantages of carbon fiber at little or no additional cost as compared with aluminum spars.

Another object of the invention is to provide a high modulus fiber spar having an integral sail-attaching groove.

A further object of the invention is to provide a carbon fiber spar of the above character including a smooth inner surface.

Yet another object of the invention is to provide a carbon fiber spar of the above character without gluing mast pieces together.

Still another object of the invention is to provide a carbon fiber spar of the above character without routering out the sail-attaching groove.

Yet still another object of the invention is to provide a carbon fiber spar of the above character which has a relatively uniform thickness or desired non-uniform thickness around its cross section.

A still further object of the invention is to provide a method of making a spar of the above character by applying layers of carbon fiber having different circumferences.

A yet still further object of the invention is to provide a method of making a spar of the above character by weaving a layer of carbon fiber from individual strands.

These and other objects are achieved by provision of a carbon fiber spar comprising an inner layer of carbon fiber, an outer layer of carbon fiber, a sail-attaching groove formed by a hollow between the inner and outer layers of carbon fiber with the inner fiber layer forming a surface of the groove such that it is integral in one piece with the spar. The spar preferably includes a cut through the outer fiber layer into the groove.

The layers of fiber are preferably seamless sleeves or tubes which are most preferably woven on the mandrel from spools of individual fiber. The outer layer preferably has a circumference equal to that of the spar and inner layer preferably has a circumference greater than that of the spar as it also forms a surface of the integral groove.

In another aspect, the invention relates to a method of making a carbon fiber spar comprising the steps of forming a first high modulus layer, pressing the layer inwardly along a line to form a groove, applying a second high modulus layer over the first, and combining the layers together except along the line. The method preferably also includes the step of cutting through the second layer along the line into the groove.

Forming and applying the high modulus layers preferably comprises weaving. Combining preferably includes placing the layers in a mold and raising the pressure in the mold.

The method preferably also includes the step of providing a mandrel and, between forming and applying, the step of reducing a circumference of the mandrel. Most preferably, the mandrel includes a longitudinal slot and, between forming and applying, the method includes inserting the first layer into the slot.

The invention and its particular features and advantages will become more apparent from the following detailed description considered with reference to the accompanying drawings.

BRIEF DESCRIPTION OF THE DRAWINGS

FIG. 1 is a front isometric view of a carbon fiber spar in accordance with the invention in use on a sailboat.

FIG. 2 is an enlarged partial view of the carbon fiber spar of FIG. 1 illustrating operation and use of the integral sail attaching groove.

DETAILED DESCRIPTION OF THE INVENTION

Figure 3:
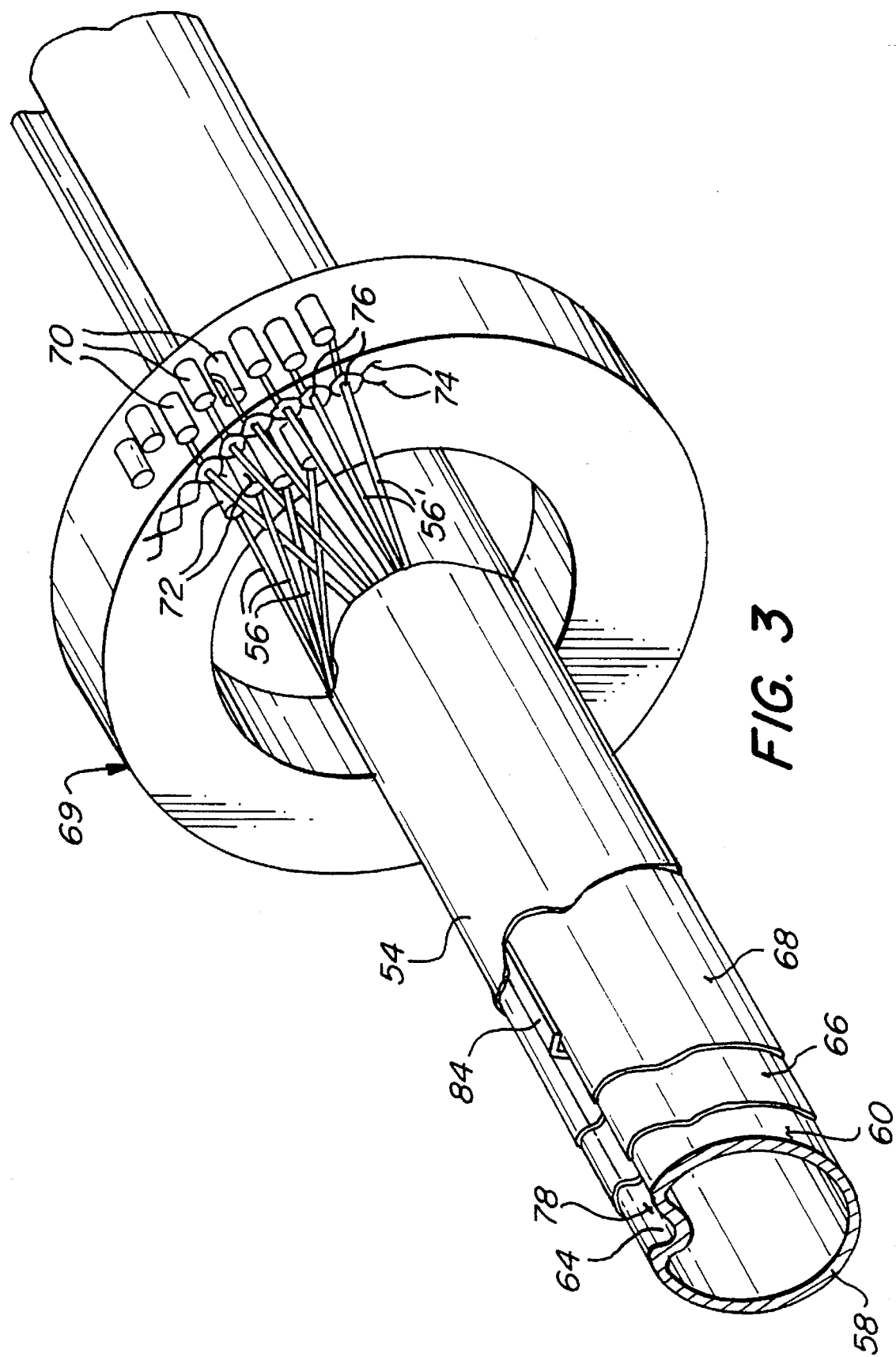
FIG. 3 is a front isometric view of a braiding machine illustrating manufacture of the carbon fiber spar of FIG. 1 and depicting the various layers of material applied to the mandrel to make the spar.

Carbon or other high modulus fiber spars 10, 10' in accordance with the invention are mounted and in use on a sailboat 8 illustrated in FIG. 1. Spar 10 is a mast and includes a groove 12 for attaching a luff edge 14 of mainsail 16 thereto. Spar 10' is a boom and includes a groove 12' for attaching a foot edge 18 of sail 16 thereto. It is understood that other spars including an integral sail-attaching groove, such as jib booms, gaffs, yards and the like are also possible and within the scope of the invention. Although, for simplicity, only mast 10 is described in detail, it is also understood that other spars would operate and be manufactured in the same or a similar manner. Similarly, although the mast is preferably a resin matrix reinforced with carbon fiber, it is understood that KEVLAR®, SPECTRA®, Fiberglass, and other fibers, particularly high modulus fibers may also be used.

Referring now also to the enlarged partial view of mast 10 in FIG. 2, additional details of the mast are illustrated. Mast 10 includes a feed slot 20 for feeding luff edge 14 of sail 16 into luff groove 12 as indicated by arrow 19. Edge 14 is retained within sail attaching groove 12 by a luff rope 21 or the like sewn into edge 14.

Edge 14 is fed into slot 20 as sail is pulled up by a halyard 22 or other sail control line (e.g. an outhaul in the case of boom 10') which may comprise a cable 24 or a rope 26 or both. Halyard 22 is connected to a head 28 of sail 16 by a shackle 30 joined to cable 24. Halyard 22 extends to the top of mast 10, turns around a sheave (not shown but indicated by dashed line 32) mounted therein and extends back down toward deck 34 of sailboat 8 within mast 10. Halyards for the spinnaker sail (not shown) and jib sail 36, as well as other sail control lines, also pass within mast 10 in order to reduce windage and tangling.

Figure 5:
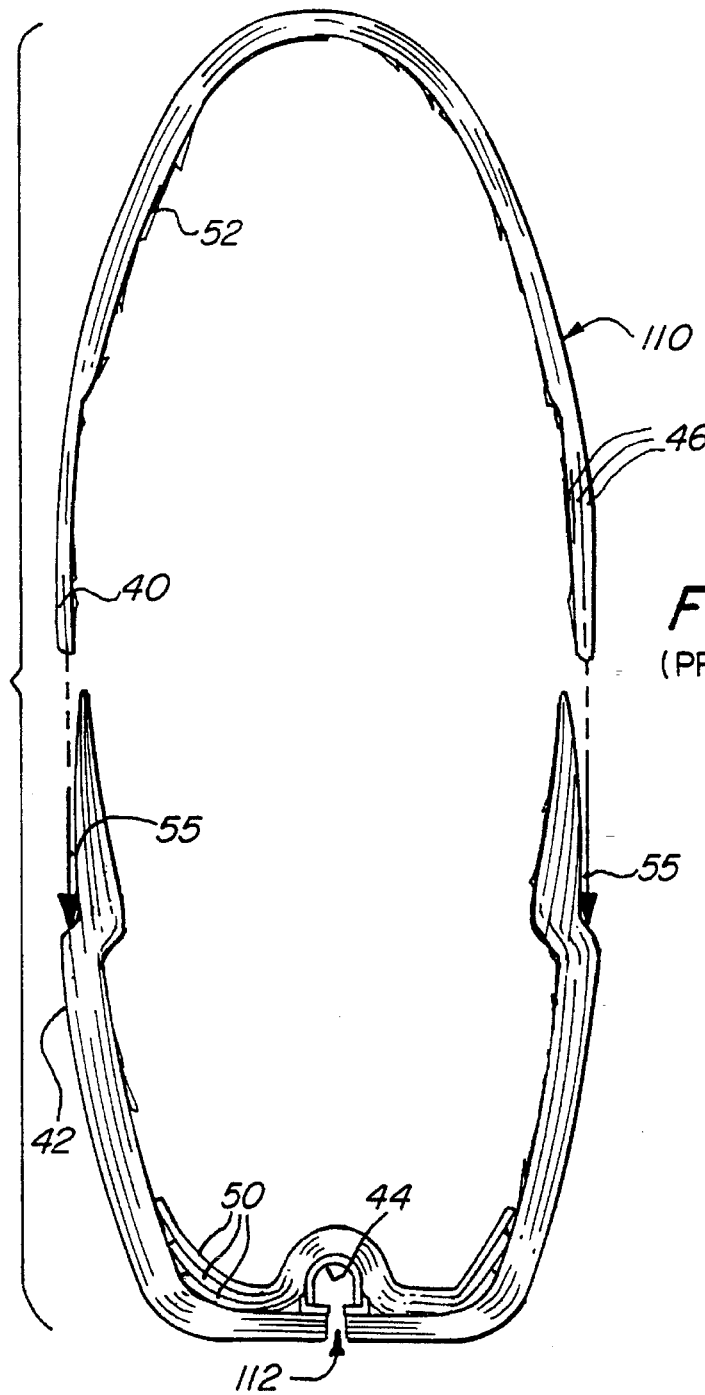
FIG. 5 is an exploded end cross-sectional view of a prior art carbon fiber mast.
Figure 6:
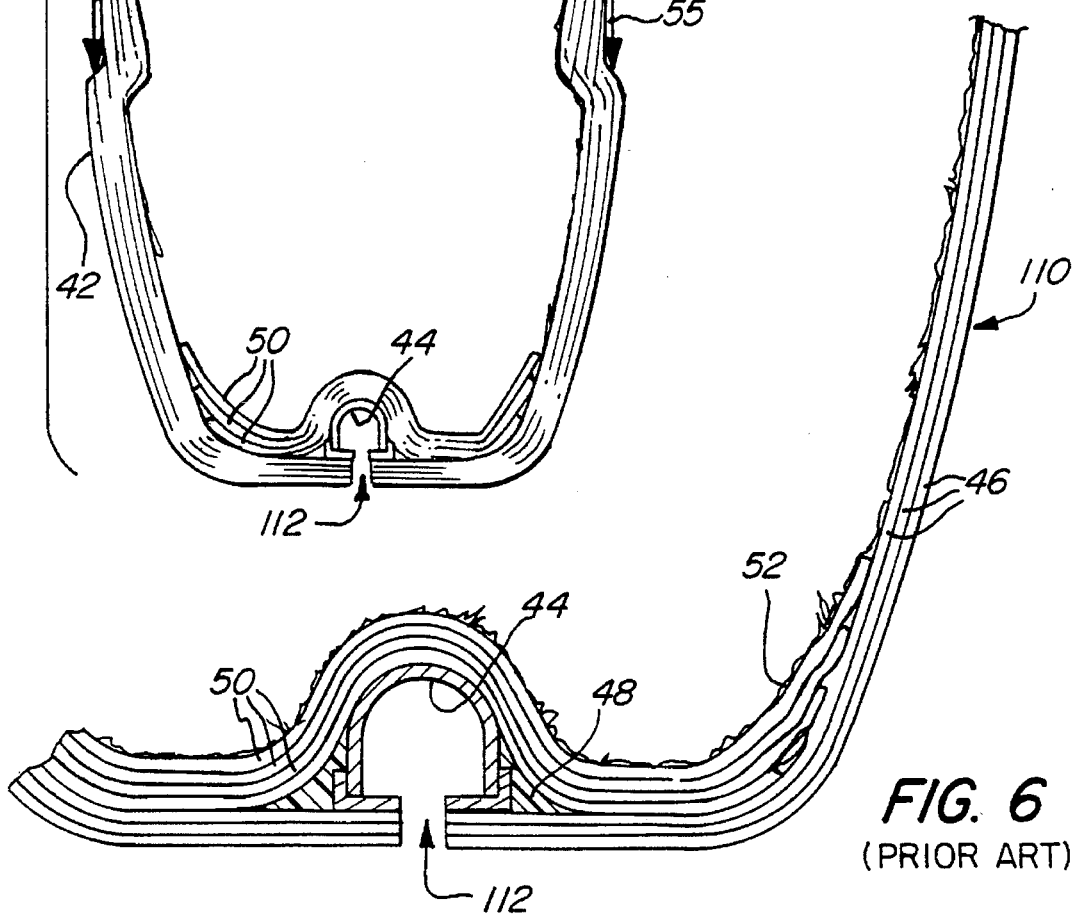
FIG. 6 is an enlarged, partial end cross-sectional view of the prior art carbon fiber mast of FIG. 4 depicting construction of the luff groove in additional detail.

The benefits of carbon and other high modulus fiber reinforcements, i.e., low weight and high strength, are well known. Also generally known is that reducing the weight of masts would provide improvements in sailboat performance. What is not known, however, is a carbon or other high modulus fiber mast which can be made at a reasonable price, how to manufacture large quantities of fiber reinforced masts, and how to reproduceably manufacture fiber reinforced masts such that each mast is substantially identical to all prior masts. Reproduceability and low cost are not reliably achieved by the prior art mast 110 illustrated in FIGS. 5 and 6 due to its two piece design, and manual lay-up construction.

Mast 110 is generally a one-of-a-kind spar used in America's Cup racing where the racing rules do not limit the amount of money which may be spent by a competitor. These masts were very expensive, but the America's Cup design rules encourage innovation regardless of cost.

Mast 110 is made from front and back halves 40, 42 to provide access for attaching groove mold 44 to outer carbon fiber layers 46 with glue 48. Layers 46 are laid-up by hand and precured prior to attachment of groove mold 44. Next, additional carbon fiber layers 50 are hand laid over mold 44 and cured layers 46. Inner surface 52 of layers 46 and 50 may be rough and irregular due to the hand lay-up process. A rough inner mast surface mast is disadvantageous because it may snag or abrade sail control lines passing therethrough.

After layers 50 have been cured, mast halves 40, 42 are then glued together, as indicated by arrows 55 in FIG. 4, to form a mast having a two piece circumference. Mast 110 has a wall thickness which may vary along its length in addition to varying around its circumference. The varying thickness of prior art mast 110 may disadvantageously effect predictability of flex characteristics and reduce mast reproduceability. Identicalness of successive masts is necessary if fiber reinforced masts are to be adopted by sailboat design classes and approved for use in sailboat races.

Referring now to FIGS. 3 and 4A–4E, the details of construction and a method of making mast 10 in accordance with another object of this invention are shown. FIGS. 4A–4E illustrate stages or steps in the manufacturing process and FIG. 3 illustrates application of outer sleeve, seamless layer or ply, or tube 54 of high modulus fiber 56. It is understood that inner sleeve 68 of fiber is applied in the same manner by the same device.

Figure 4A:
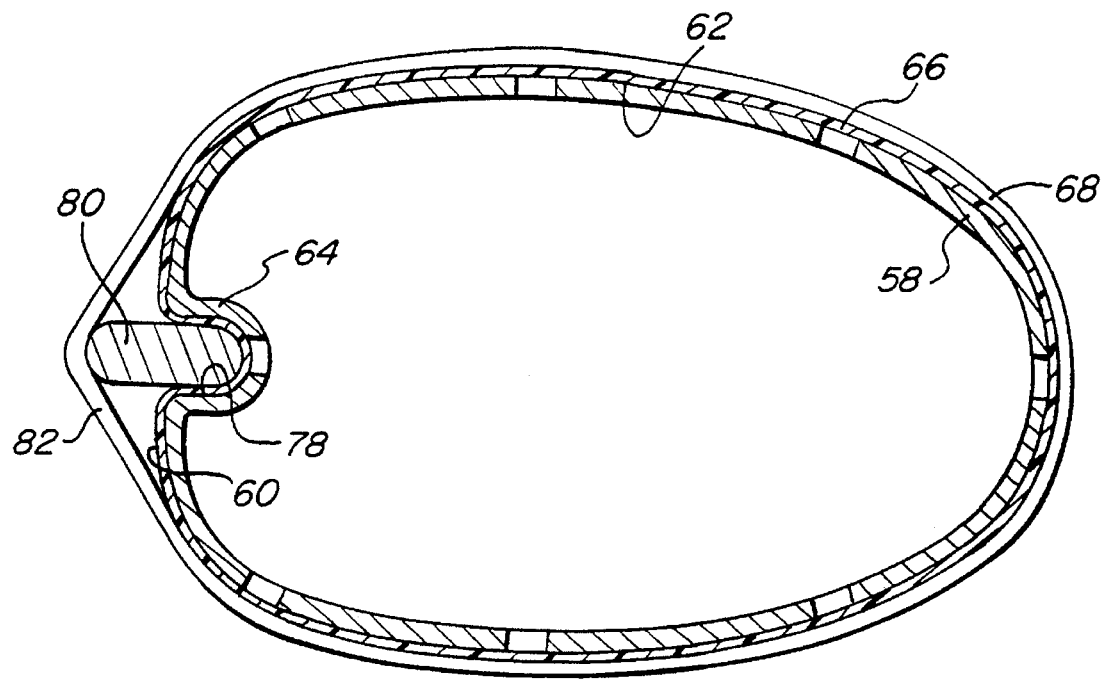
FIGS. 4A–4E are end cross-sectional views of the carbon fiber spar of FIG. 1 illustrating various stages in a method of making the carbon fiber spar in accordance with another aspect of the invention.

Beginning with FIG. 4A, mast 10 is built upon a male mandrel 58 the outer surface 60 of which (see FIG. 3) molds, forms or tools inner surface 62 of the mast smooth to reduce the possibility of snagging or a braiding sail control lines passing therethrough. Mandrel 58 is conveniently formed from extruded aluminum, and includes a longitudinal slot 64. An inner plastic layer or sleeve 66 is placed over mandrel 58 for later use to vacuum bag mast 10, as described below with reference to FIGS. 4D and 4E.

Next, an inner layer 68 of high modulus or carbon fiber 56, 56' is braided or woven onto mandrel 58. Layer 68 is preferably a seamless tube or sleeve, but may also comprise a seamed sleeve or the inner ply of a wrapped sheet. It is also understood that instead of applying individual fibers, layer 68 may be composed of individually applied fiber bundles, or of fiber sheets or fabric wrapped around the mandrel.

As illustrated in FIG. 3, sleeve 68 is woven on mandrel 58 by braiding head 69 from substantially longitudinal or warp fibers 56' dispensed from a plurality of fixed bobbins 70 and substantially helical or spiralling fill fibers 56 dispensed from a plurality of orbiting bobbins 72. Warp fibers 56' may also be introduced from spools and guides which allow application directly to mandrel 58 without being interwoven with fill fibers 56. In this regard, the properties of a high modulus fiber such as carbon can be fully realized since the warp fibers are in line with compression loads on the mast without being bent around fill fibers. Further, by introducing fill fibers at only selected locations along mast 10, the thickness and flex characteristics of the mast can be tailored and controlled.

Successive bobbins 72 follow alternating ones of serpentine paths 74 which repeatedly pass under and over warp fibers 56'. Warp fibers 56' pass through thread guides 76 located between paths 74. Resin is individually applied to fibers 56, 56' by a plurality of associated rings or funnels (not shown) as the fibers are drawn from bobbins 70, 72. Bobbins 72 orbit mandrel 58 as either the mandrel or braiding head 69 is moved longitudinally such that fibers 56 are dispersed along spiralling paths. Braiding head 69 is only shown schematically and it is understood that it is either mounted on the floor or with an overhead gantry system. Braiding head 69 may be provided as a Wardwell Braiding Machine from the Wardwell Braiding Machine Company, 1211 High Street, Central Falls, R.I. 02863.

Inner layer 68 is applied with a circumference sufficient to cover the entire outer surface 60 of mandrel 58 including inverted surface 78 of slot 64. By "inverted" is meant that surface 78 is concave out. Since braiding head 69 is only capable of applying fiber directly to surfaces which are convex about the radial axis x, a removable mandrel extender rod 80 is placed within slot 64 prior to sleeve 68 application. Mandrel extender rod 80 extends the effective concave in circumference of mandrel 58 to provide sleeve 68 with an excess circumferential portion 82 sufficient to cover surface 78 of groove 64. By "excess" is meant that part of the circumference which is greater than a circumference of mast or spar 10.

Figure 4B:
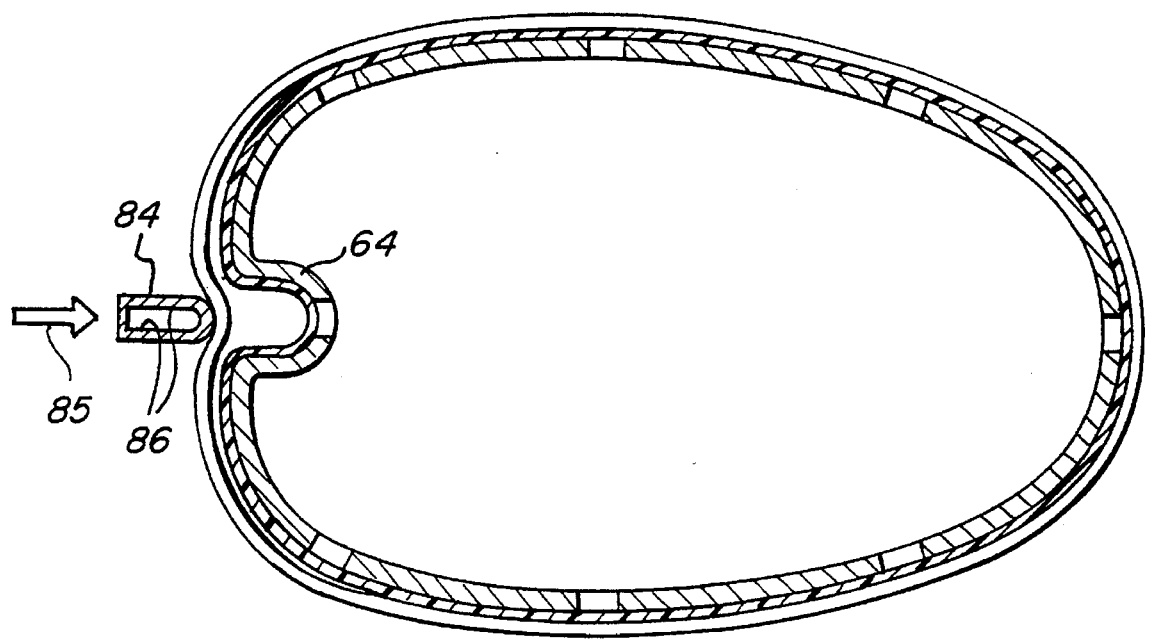

After application of layer 68, mandrel extender rod 80 is removed and excess circumferential portion 82 is pressed into slot 64, as illustrated in FIG. 4B, to cover surface 78. It is understood that instead of removable extender 80, the effective circumference of mandrel 58 may be reduced a number of other ways such as by creating slot 64 in the mandrel, by deflating an inflatable mandrel, or by mechanically reducing the size of the mandrel. A spacer 84 made of a heat resistant plastic such as PVC or the like is used to press excess 82 into slot 64 as indicated by arrow 85. Spacer 84 substantially completely fills slot 64, reducing the circumference of mandrel 58 without reducing the effective circumference for application of high modulus sleeves. In this regard, spacer 84 fills slot 64 such that the combination of mandrel 58 and spacer 84 is entirely concave in. Spacer 84 is hollow and forms the inner walls 86 of sail attaching groove 12.

Figure 4C:
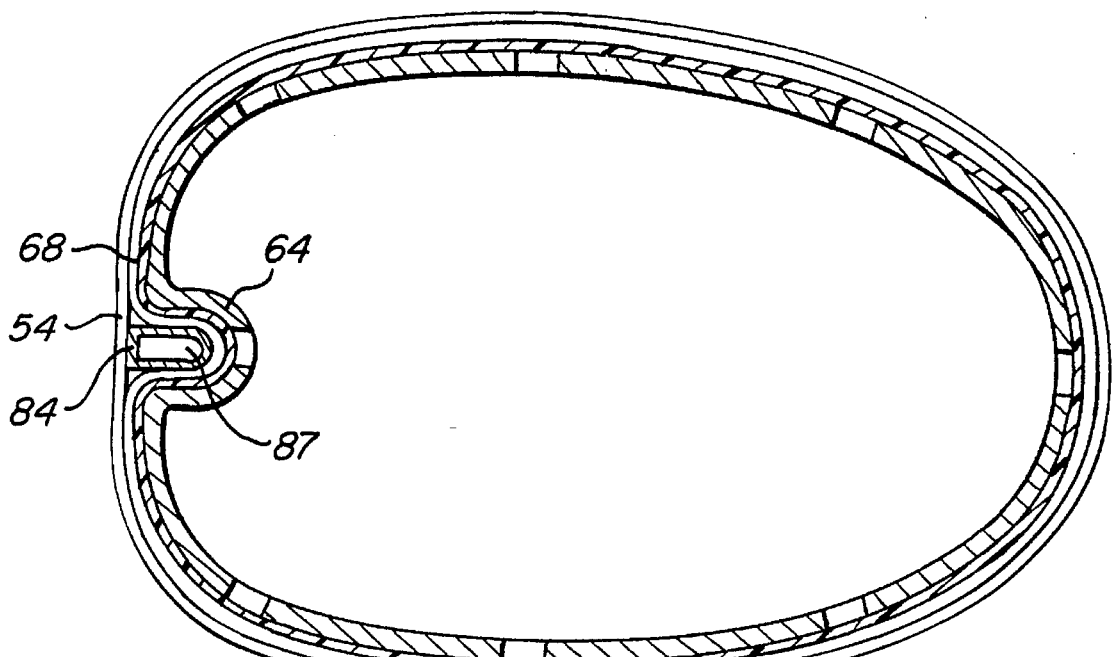

Referring to FIGS. 3 and 4C, mandrel 58 including plastic layer 66, high modulus layer 68, and spacer 84 is returned to braiding machine 69 for application of outer layer 54 of high modulus fibers 56, 56'. Like layer 68, layer 54 is preferably a seamless tube or sleeve, but may also comprise a seamed sleeve or the outer ply of a wrapped sheet. Outer layer 54 has a smaller circumference than inner layer 68 of fiber since inner sleeve 68 forms not only the circumference of mast 10 but also the inwardly extending sail attaching groove 12. Layers 54 and 68 contact each other completely around mandrel 58 except for a hollow 87 along slot 64 where inner layer 68 follows groove surface 78 while outer layer 54 follows the effective or non-inverted circumference of mandrel 58.

Figure 4D:
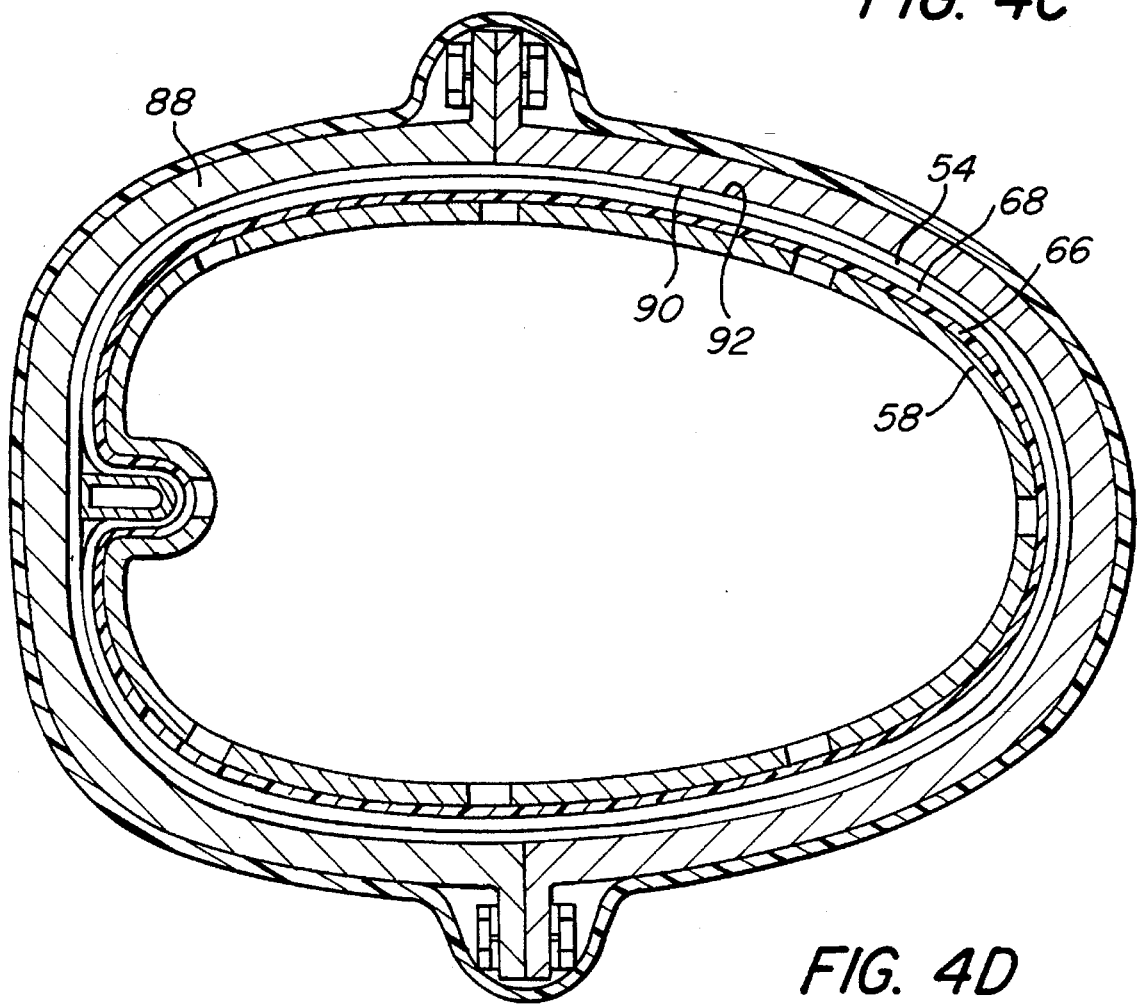

Referring now to FIG. 4D, mandrel 58, including plastic layer 66, inner and outer high modulus fiber layers 54, 68, and spacer 84, is placed in a two part female mold 88. Mold 88 includes an inner surface 90 which forms, molds or tools an outer surface 92 (also see FIG. 2) of mast 10. Next, a plastic layer, bag or sleeve 94 is placed over mold 88 to encase high modulus fiber layers 54 and 68 between plastic layers. A vent line (not shown in any Figure) is sealed between plastic layers 66 and 94, and is connected to a vacuum pump creating a vacuum bag for effectively pressing layers 54 and 68 together with an equivalent pressure of about 14 psi.

Figure 4E:
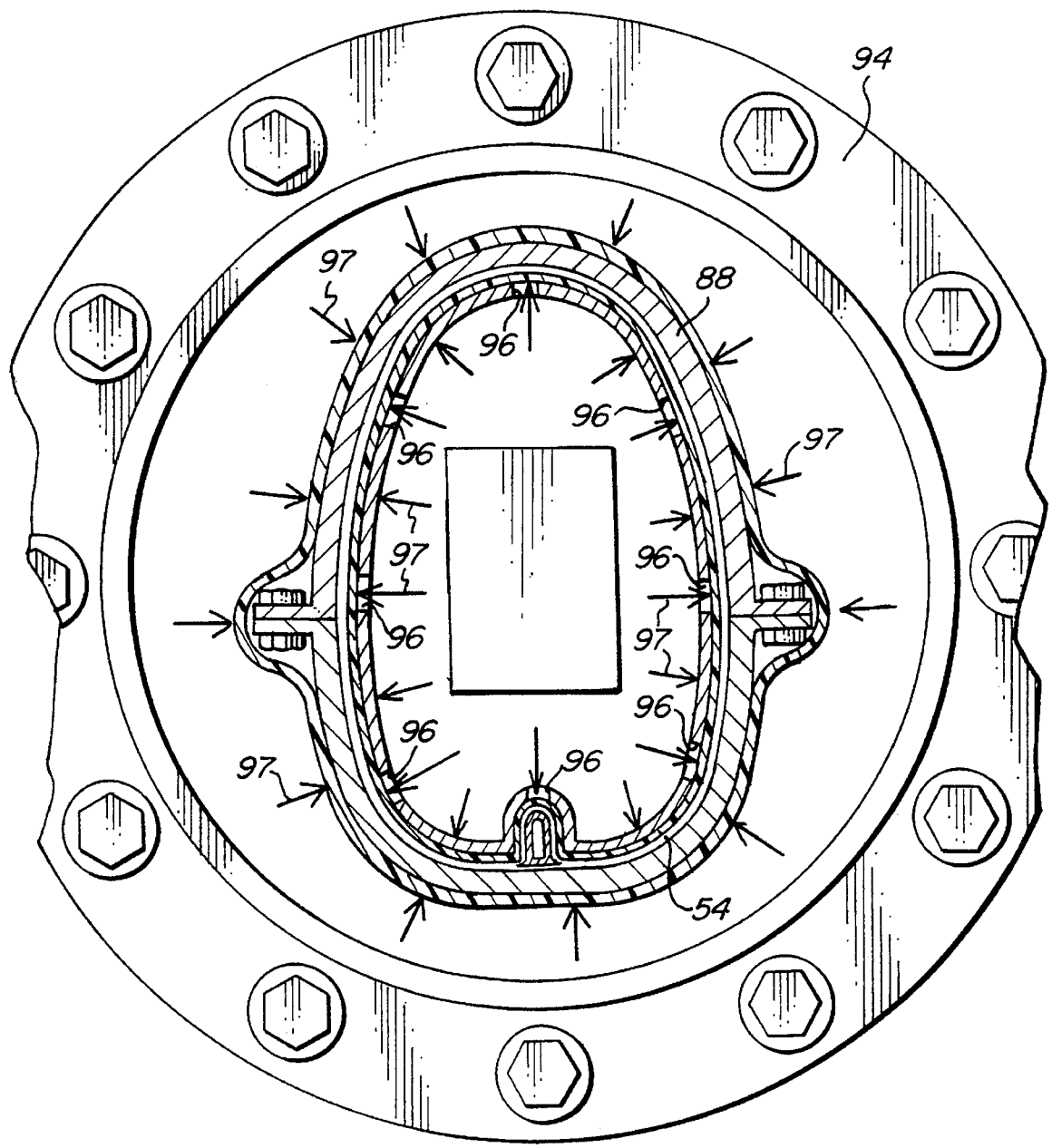

Referring to FIG. 4E, the entire assembly of FIG. 4D is placed within a pressure chamber 94. Mandrel 58 is hollow and includes a plurality of holes 96 permitting equalization of pressure on both sides of mold 88 as indicated by arrows 97. By pressurizing both sides of the vacuum bag up to about 150 psi, chamber 94 exerts an effective pressure of up to about 164 psi, and preferably between about 42 and 112 psi, to fiber layers 54, 68. Layers 54 and 68 are combined, cured or bonded into an integral one piece mast, by the resin applied to the individual fibers, with a combination of pressure and heat provided by a heating element 98 located within mandrel 58. Heating element 98 is adjustable to vary the ramp up, dwell and cool down times and temperatures.

Mast 10 is completed by removing mold 88 and mandrel 58, and cutting through outer layer 54 into the hollow center of spacer 84 to complete luff groove 12. A feed slot 20 (see FIG. 2) may also need to be cut in outer layer 54.

Although the invention has been described with reference to a particular arrangement of parts, features, steps, and the like, these are not intended to exhaust all possible arrangements, parts, steps, or features, and indeed many other modifications and variations will be ascertainable to those of skill in the art.

What is claimed is:

1. A sailboat spar comprising:
   a first sleeve of resin and fiber having a circumference greater than a circumference of the spar;
   a second sleeve of resin and fiber having a circumference substantially equal to the spar circumference;

a hollow between said first and second sleeves formed by a longitudinal portion of the first sleeve circumference which extends beyond the spar circumference, said hollow formed when said first and second sleeves are combined together with said first sleeve within said second sleeve to form the spar with a one piece circumference; and an elongate cut in said second sleeve intersecting said hollow to form a sail-attaching groove integral in one piece with the spar.

2. The sailboat spar of claim 1 wherein said first and second sleeves are combined together with the resin which binds the fibers of each of said sleeves together.

3. The sailboat spar of claim 1 wherein said first sleeve has a smooth inner surface.

4. The sailboat spar of claim 1 wherein said fiber has a high modulus.

5. The sailboat spar of claim 1 wherein said sleeves are woven high modulus fiber.

6. The sailboat spar of claim 5 wherein one of said sleeves is provided as a sheet.

7. The sailboat spar of claim 6 wherein both of said sleeves are provided as a sheet.

8. In a fiber-reinforced spar having inner and outer surfaces and a sail-attaching groove, the improvement comprising:

an inner layer forming the inner surface of the spar;

an outer seamless sleeve forming the outer surface of the spar;

the groove formed between said inner layer and outer seamless sleeve of fiber such that said inner layer also forms a surface of said groove to form the groove integrally in one piece with the spar; and said groove being hollow for receiving a sail edge.

9. The fiber-reinforced spar of claim 8 wherein said inner fiber layer is seamless.

10. The fiber-reinforced spar of claim 8 wherein said inner and outer fiber layers are woven.

11. A method of making a sailboat spar comprising the steps of:

forming a first fiber layer;

pressing the first layer inwardly along a line to form a longitudinal groove therein;

applying a second fiber layer over the first layer;

combining the first and second layers together except along the line; and cutting through the second layer along the line to provide the spar with an integral sail attaching groove.

12. The spar making method of claim 11 wherein said first forming step comprises weaving the first fiber layer.

13. The spar making method of claim 11 wherein said second forming step comprises weaving the second fiber layer.

14. The spar making method of claim 11 wherein said combining step comprises inserting the first and second fiber layers to a mold, and pressing the layers against an inside surface of the mold.

15. The spar making method of claim 14 wherein the pressing step comprises raising the pressure inside the mold.

16. The spar making method of claim 15 wherein said combining step further comprises vacuum bagging the first and second layers.

17. A method of making a spar comprising the steps of:

providing a mandrel having a longitudinal slot;

weaving a first layer of fiber around the mandrel surface and over the mandrel slot;

reducing a circumference of the mandrel;

weaving a second layer of fiber around the reduced circumference mandrel surface and over the mandrel slot; and combining the fiber layers together in the region of the mandrel surface to provide the spar with a one piece circumference and an integral longitudinal hollow.

18. The spar making method of claim 17 including, between the weaving steps, the step of inserting the first layer of fiber into the longitudinal slot.

19. The spar making method of claim 18 including the step of cutting through the second fiber layer into the longitudinal slot to form a sail-attaching groove.

20. The spar making method of claim 18 wherein the inserting step comprises inserting the first layer of fiber into the longitudinal slot by pressing a hollow spacer into the slot which reduces a circumference of the mandrel.

21. The spar making method of claim 17 including, after the providing step, the step of providing a rod for inserting in the longitudinal mandrel slot.

22. The spar making method of claim 21 wherein the circumference reducing step comprises removing the rod from the longitudinal mandrel slot.

23. The spar making method of claim 22 including, after the removing step, the step of pressing the first fiber layer into the longitudinal slot.

24. The spar making method of claim 17 wherein the combining step includes molding an inner surface of the spar with the mandrel.

25. The spar making method of claim 17 wherein the combining step comprises inserting the mandrel and the first and second fiber layers to a mold.

26. The spar making method of claim 25 wherein the providing step further comprises providing a mandrel having a plurality of holes, and wherein the combining step comprises pressurizing the mandrel to press the fiber layers against the mold surface.

27. The spar making method of claim 26 wherein the combining step comprises vacuum bagging the first and second fiber layers together with the mold.

* * * * *